United States Patent
Nguyen et al.

(10) Patent No.: US 10,289,186 B1
(45) Date of Patent: May 14, 2019

(54) SYSTEMS AND METHODS TO IMPROVE ENERGY EFFICIENCY USING ADAPTIVE MODE SWITCHING

(71) Applicant: Maxim Integrated Products, Inc., San Jose, CA (US)

(72) Inventors: Hung Thanh Nguyen, Plano, TX (US); Nancy Kow Iida, Irving, TX (US); Edward Tangkwai Ma, Plano, TX (US); Robert Michael Muchsel, Addison, TX (US); Gary Vernon Zanders, Fairview, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 374 days.

(21) Appl. No.: 14/188,407

(22) Filed: Feb. 24, 2014

Related U.S. Application Data

(60) Provisional application No. 61/898,388, filed on Oct. 31, 2013.

(51) Int. Cl.
  *G06F 1/32* (2019.01)
  *G06F 1/324* (2019.01)
(52) U.S. Cl.
  CPC .................. *G06F 1/324* (2013.01)
(58) Field of Classification Search
  USPC ....... 713/300, 310, 320, 321, 322, 323, 324, 713/330, 340, 375
  See application file for complete search history.

(56) References Cited

U.S. PATENT DOCUMENTS

| | | | | |
|---|---|---|---|---|
| 5,107,465 A | * | 4/1992 | Fung | H03K 3/0372 365/190 |
| 6,715,095 B1 | * | 3/2004 | Larsen | G06F 1/12 713/324 |
| 7,613,853 B2 | * | 11/2009 | Chauhan | H04L 25/45 326/82 |
| 8,144,689 B2 | * | 3/2012 | Chelstrom | G06F 1/12 370/351 |
| 2002/0120883 A1 | * | 8/2002 | Cook | G06F 9/3869 713/600 |

(Continued)

OTHER PUBLICATIONS

Grass et al., "A dual-mode synchronous/asynchronous CORDIC processor," Proceedings of the Eighth International Symposium on Asynchronous Circuits and Systems (ASYNC'02), 1522-8681/02, 2002 (8 pgs.).

*Primary Examiner* — Jaweed A Abbaszadeh
*Assistant Examiner* — Keshab R Pandey
(74) *Attorney, Agent, or Firm* — North Weber and Baugh LLP

(57) ABSTRACT

Various embodiments of the invention allow to dynamically transition between clock-driven and even-driven circuit elements to enable automatic multi-mode operation to enable low-power and high-throughput applications. In certain embodiments, dynamic transitioning is accomplished through a mode control unit that evaluates input data from a number of sources to determine whether to initiate a transition. Certain embodiments take advantage of dynamic transitioning to allow for energy harvesting in a data gathering phase by switching to high power communication phase as needed. The energy harvesting scheme is particularly suited for battery-operated applications that benefit from a reduction in overall power consumption.

17 Claims, 12 Drawing Sheets

(56) References Cited

U.S. PATENT DOCUMENTS

| | | | | |
|---|---|---|---|---|
| 2003/0161355 A1* | 8/2003 | Falcomato | ............ | H04J 3/0623 |
| | | | | 370/539 |
| 2003/0206071 A1* | 11/2003 | Wong | ........................ | G06F 1/08 |
| | | | | 331/176 |
| 2005/0135424 A1* | 6/2005 | Karaki | ................ | G06F 13/4072 |
| | | | | 370/474 |
| 2005/0273639 A1* | 12/2005 | Pessolano | .............. | G06F 9/3869 |
| | | | | 713/400 |
| 2006/0156046 A1* | 7/2006 | Jacobson | .............. | G06F 1/3203 |
| | | | | 713/300 |
| 2006/0171222 A1* | 8/2006 | Blasi | .................... | G11C 7/1063 |
| | | | | 365/203 |
| 2007/0030030 A1* | 2/2007 | Waldrop | .............. | G11C 7/1045 |
| | | | | 326/93 |
| 2008/0049673 A1* | 2/2008 | Park | ..................... | H04W 36/30 |
| | | | | 370/331 |
| 2009/0161451 A1* | 6/2009 | Kim | ........................ | G11C 5/14 |
| | | | | 365/191 |
| 2011/0176503 A1* | 7/2011 | Patel | .................... | H04W 36/14 |
| | | | | 370/329 |
| 2012/0124255 A1* | 5/2012 | DiBartolomeo | ......... | G21D 3/00 |
| | | | | 710/104 |
| 2012/0324462 A1* | 12/2012 | Miljanic | ............. | G06F 15/7867 |
| | | | | 718/103 |
| 2013/0079026 A1* | 3/2013 | Hagedorn | .............. | H04W 4/008 |
| | | | | 455/456.1 |
| 2013/0111253 A1* | 5/2013 | Lewis | ................. | G11C 7/1075 |
| | | | | 713/400 |

\* cited by examiner

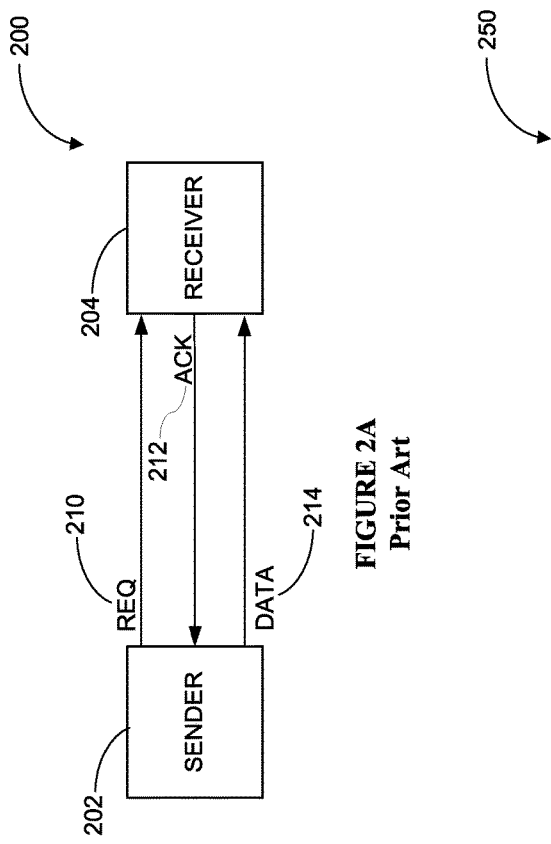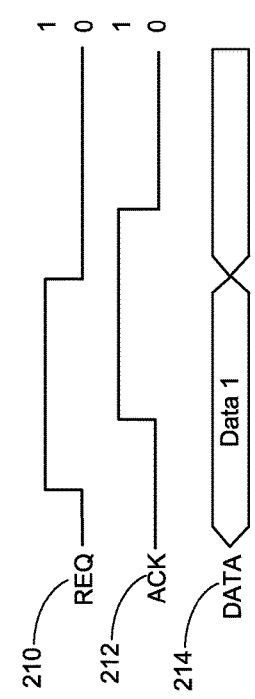
FIGURE 2A
Prior Art
FIGURE 2B
Prior Art

SYSTEMS AND METHODS TO IMPROVE ENERGY EFFICIENCY USING ADAPTIVE MODE SWITCHING

CROSS REFERENCE TO RELATED PATENT APPLICATIONS

This application claims priority to U.S. Provisional Application No. 61/898,388, titled "Systems and Methods to Improve Energy Efficiency in Using Self-Adaptive modules," filed Oct. 31, 2013 by Hung Thanh Nguyen, Nancy Kow Iida, Edward Tangkwai Ma, Robert Michael Muchsel, and Gary Vernon Zanders, which application is hereby incorporated herein by reference in its entirety.

BACKGROUND

A. Technical Field

The present invention relates to data processing circuits and, more particularly, to systems, devices, and methods of increasing energy efficiency in secure sensor systems using digital logic.

B. Background of the Invention

In a rapidly growing number of modern circuits used in medical applications, personal payments, and resource management, the combination of low EMI, high security, low power consumption, and high reliability is becoming increasingly desirable. The trend towards mobile devices, in particular, imposes an inherent limitation on maximal allowable power consumption, and presents security challenges that call for measures against intrusion that can compromise the proper operation of devices containing high-speed digital circuitry.

Traditional digital circuits are well-understood synchronous designs that rely on clocked networks and are supported by widely available design tools. FIG. 1 is an example of a conventional digital circuit that uses a synchronous microcontroller core having multiple pipeline stages. In FIG. 1, CLK 120 denotes a global clock signal that is routed to each pipeline stage FS (Fetch) 102, DR (Decode/Read) 104, EX (Execute) 106, and WB (Write-Back) 108 within microcontroller core 100. The operation of each pipeline stage 102-108 begins and ends within a fixed time frame. However, clocked circuits as in FIG. 1, suffer from a number of issues including 1) noise problems associated with high di/dt transitions at clock edges; 2) susceptibility to varying process and operating conditions, such as fluctuations in the supply voltage; 3) vulnerability to leakage of confidential information through side channel attacks due to the relatively easy detectability of electromagnetic, power, and timing signatures generated; and 4) wake-up delays when transitioning out of a "sleep" condition (by sampling an input signal, starting a frequency generator, etc.). Therefore, such clocked circuits are not well suited to achieve the desired combination of low EMI, high security, low power consumption, and high reliability that can meet the demands of modern applications.

On the other hand, asynchronous circuits (frequently also called handshake-based, event-driven, or clock-less circuits) offer several advantages over clocked circuits. Due to their asynchronous nature, clock-less circuits 1) have significantly less noise problems; 2) are more robust against varying process and operating conditions; 3) offer additional side channel attack resistance in security applications (e.g., by reducing electromagnetic signatures and using white noise in order to effectively hide encryption keys); and 4) instantaneously resume operation when transitioning out of an idle condition.

One key characteristic of asynchronous circuits, the use of event-driven handshake control signals that initiate logic transitions rather than a centralized clock signal, is illustrated in FIG. 2A. Handshake signaling between sender 202 and receiver 204 exchanging request signal (REQ) 210, acknowledge signal (ACK) 212, and Data signal (DATA) 214 in an asynchronous circuit 200 can be implemented in several ways. Oftentimes, a 4-phase return-to-zero signaling scheme 250 shown in FIG. 2B is preferred over alternate methods, such as 2-phase non-return-to-zero handshaking (not shown). FIG. 2B shows a timing diagram for a conventional 4-phase return-to-zero handshaking. The use of four transitions per transfer associated with 4-phase handshaking is outweighed by the simplicity and efficiency benefits of the control logic that is required to operate 4-phase return-to-zero signaling scheme 250.

However, while significant research has been undertaken in the area of asynchronous circuits, commercial applications have been slow to adopt asynchronous designs due to some difficulties inherent to asynchronous circuits, including 1) timing hazards risks (e.g., race and synchronization issues in concurrent operations; deadlocks due to the complexity of handshaking networks; and challenges in properly handling feedback loops); 2) impracticability of re-using existing IP in system design; 3) lack of support by FPGA technology; 4) lack of support by commercial design automation tools that can slow down design projects; and 5) lack of structural test support (e.g., scan, ATPG, BIST), which causes testability and manufacturability issues for custom designs. Existing approaches, such as globally asynchronous locally synchronous design (GALS), do not adequately address the above-mentioned shortcomings.

One synchronous-only implementation combines a fast but power-hungry high-power core (e.g., Cortex-A15) with a slow, low-power core (e.g., Cortex-A7). However, such approaches suffer from a significant increase in circuit size, in effect doubling the number of cores required to operate the circuit. Multi-processing versions that power more than one core at a time additionally suffer from complexities associated with switching from slow sections of the circuit to the fast sections and vice versa. What is needed are systems and methods that allow system designers to harness the advantages of clock-less circuits while overcoming significant practical limitations of clock-less circuits.

SUMMARY OF THE INVENTION

The disclosed systems and methods allow to dynamically transition between clock-driven and event-driven operation in circuits that comprise both synchronous and asynchronous circuit elements. In various embodiments of the invention, multi-mode operation enables high-power communication in a clocked mode, while a data gathering phase operates in a low-power clock-less mode to reduce overall energy consumption in the circuit.

In certain embodiments, automatic transitions from the low-power mode to the high-power mode are enabled by a mode control unit. In some embodiments, energy, security, and system load control functions are combined to dynamically generate a mode control signal.

In various embodiments, the mode control unit receives input signals that represent conditions internal or external to the circuit, such environmental conditions, request signals, and signals related to factory testing; detects and analyzes the input signals; assigns priorities to them; calculates optimum modes from the assigned priorities; and generates transition signals to effectuate mode changes. The mode control unit may be controlled statically and transition signals may be delayed to prevent excessive mode switching. In some embodiments, the system automatically switches from an existing mode to a prior mode upon satisfaction of a request. In one embodiment, local, adaptive mode switching takes advantage of already present handshaking signals used for event-driven operation, and based on a global clock signal used for clock-driven operation.

Some embodiments utilize sensor data to enable harvesting energy in an asynchronous mode and exchange data with an external network. In one energy harvesting application, energy is harvested from an energy source during a sensor data gathering phase, while high power operation is enabled during a relatively shorter but computing-intense communication phase.

Certain features and advantages of the present invention have been generally described here; however, additional features, advantages, and embodiments presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIG. 2A shows a conventional Request/Acknowledge handshake between a sender and a receiver.

FIG. 2B shows a timing diagram for a conventional 4-phase return-to-zero handshaking.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document, while mainly applications drawn to microcontroller cores are shown in order to better explain the important elements of the invention, it is envisioned that the invention is applied to any kind of circuit, sub-circuit, and module recognized by one of skilled in the art.

Figure 1:
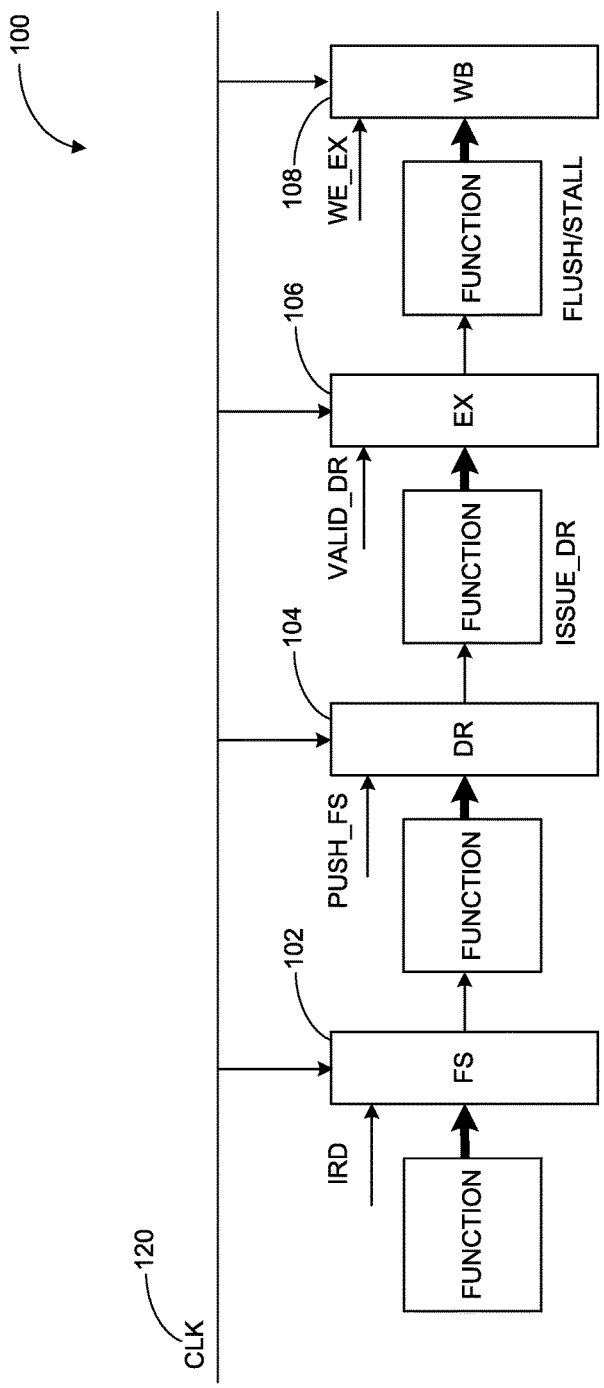
FIG. 1 is a prior art synchronous pipelined microcontroller core.
Figure 3:
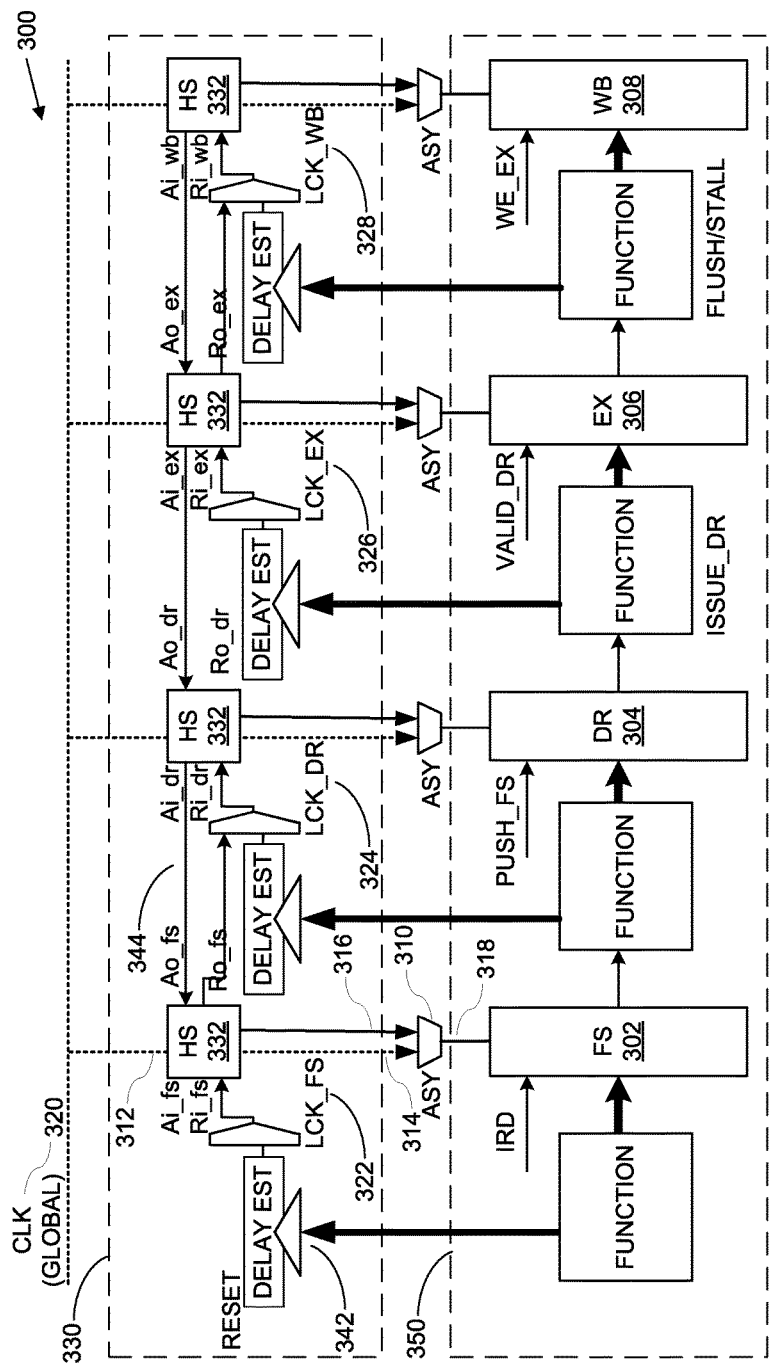
FIG. 3 illustrates an exemplary microcontroller pipeline system according to various embodiments of the invention.

FIG. 3 illustrates an exemplary microcontroller pipeline system according to various embodiments of the invention. System 300 comprises both synchronous circuit elements 320 as well as asynchronous circuit elements 330 that are coupled via mode control module 310. In example in FIG. 3, asynchronous circuit elements 330 comprise delay estimator block 342 and handshake block 332. Handshake block 332 further comprises Acknowledge/Request input and output signals 344 denoted as Ai_nn; Ao_nn; Ri_nn; and Ro_nn, respectively.

In one embodiment, handshake block 332 provides "local control" signals denoted as LCK_FS 322, LCK_DR 324, LCK_EX 326, and LCK_WB 328 to an input of mode control module 310. CLK 320 is a global clock signal that serves as input signal to each pipeline stage FS 302, DR 304, EX 306, and WB 308 in microcontroller core 300. It is noted that stages FS 302 represent any set of data processing elements that are coupled in series.

In one embodiment, the state of mode control module 310 is controlled by control signals (not shown) generated external to system 300. In one embodiment, the state of mode control module 310 is controlled statically, e.g., in nonmicrocontroller implementations. In one embodiment, mode control module 310 is implemented as a multiplexer device.

In operation, system 300 supports both clock-driven and event-driven sequences due to the presence of synchronous circuit elements 320 and asynchronous circuit elements 330. The state of mode control module 310 determines in which mode system 300 operates.

In one embodiment, in event-driven mode, the output of delay estimator block 342 is applied to Acknowledge/Request input and output signals 344 to cause handshake block 332 to generate local control signals 322-328. It is noted that while system 300 depicts a delay sensitive circuit, this is not intended as a limitation on the scope of the present invention as the principles of the invention can be equally applied to delay-insensitive circuits.

In one embodiment, in clock-driven synchronous mode, system 300 enables high-frequency operation and allows to interface with existing synchronous circuitry, subsystems, and modules, thereby, supporting emulation technology for early code development. This allows for use of synchronous Design for Testability (DFT) techniques, such as scan and memory BIST, without requiring specialized interfacing to traditional production automated test equipment. Additionally, existing EDA tools from traditional synchronous design flows (e.g. verification, scan insertion, timing closure, place and route) can be utilized.

In systems comprising two or more microcontroller cores, each core or subsystem may operate in a particular mode at any given time. For example, one core may operate synchronously, while another core operates asynchronously. It is envisioned that different modules and subsystems may share clock signal 320. In one embodiment, in event-driven, asynchronous mode, system 300 enables one or more of low power operation, fast wakeup times, low EMI, and high-security functions.

In multi-mode operation, system 300 may be alternated between clock-driven to event-driven operation, for example, in order to enable scalability of both power and performance. In one embodiment, the state of mode control module 310 is controlled statically and system 300 operates synchronously in test mode, e.g., as part of system initialization in a factory environment that uses standard tools for verification, production testing, and analysis purposes. In this embodiment, outside of production testing and verification, system 300 is switched to asynchronous mode, for example, when operated by an end-user.

Figure 4:
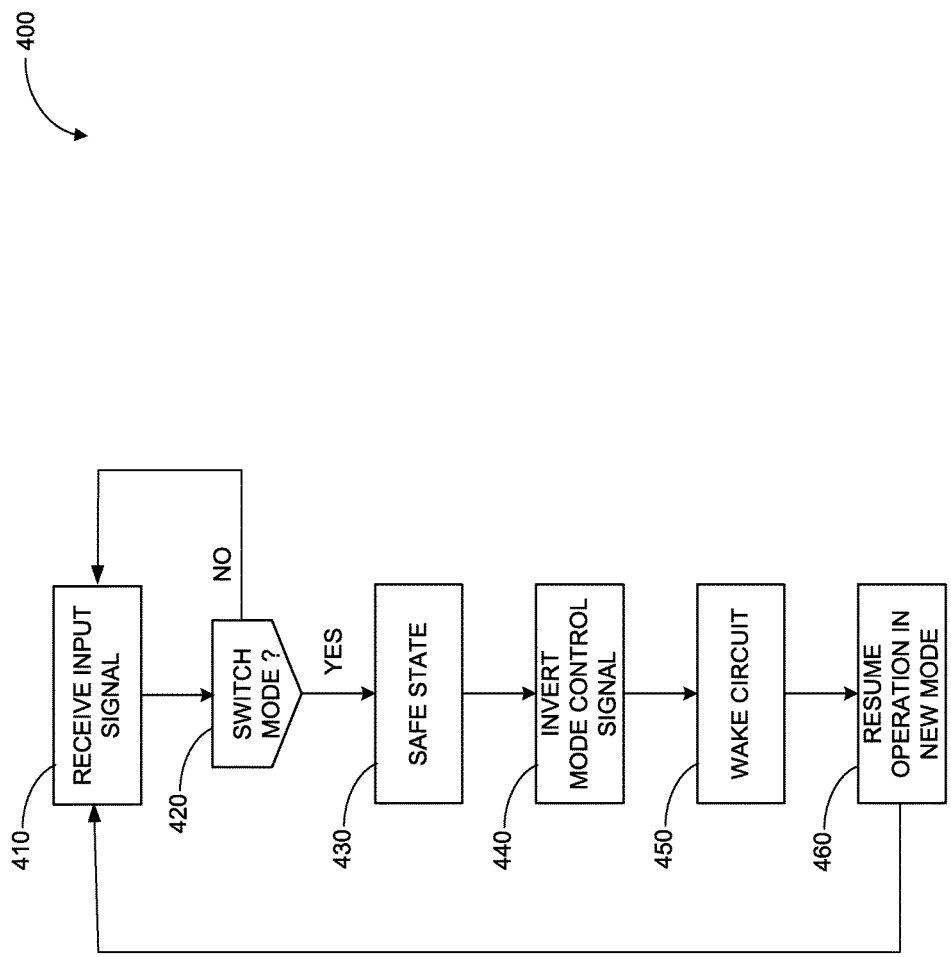
FIG. 4 is a flowchart illustrating an exemplary method to dynamically switch between clock-driven and event-driven operation, according to various embodiments of the invention.

FIG. 4 is a flowchart illustrating an exemplary method to dynamically switch between clock-driven and event-driven operation, according to various embodiments of the invention.

At step 410, an input signal is received. The input signal is representative of an environmental condition that is internal or external to the circuit.

At step 420, it is determined whether to transition from an existing mode into a different mode.

If the decision is affirmative, at step 430, a safe state is entered into. The safe state may be specific to a circuit implementation. In one embodiment, in a pipelined microcontroller circuit, safe state 430 comprises a pipeline flush, which comprises making idle predetermined sections of the circuit, flushing buffers, and suspending concurrent operation of sections of the circuit.

At step 440, a mode control signal is inverted in response to determining that the system has entered safe state 430.

At step 450, parts of the circuit are put into an idle state or sub-sections of the circuit are awakened from an idle state, for example by sampling an input signal and starting a frequency generator in response thereto, so as to enable the circuit to operate in the different mode.

At step 460, the circuit is operated in the different mode.

It will be appreciated by those skilled in the art that fewer or additional steps may be incorporated with the steps illustrated herein without departing from the scope of the invention. No particular order is implied by the arrangement of blocks within the flowchart or the description herein.

Mode switching may be triggered, for example, in response to an interrupt request or the detection of a condition that is external to the circuit. In one embodiment, upon satisfaction of the request or performing of the requested operation, the mode is automatically switched back to a prior mode. For example, when the system operates synchronously and in high-speed mode and receives a software request to perform an ADC reading, the system may determine that the ADC reading is best performed in a low-noise, low-EMI environment and accordingly switch to an asynchronous mode prior to performing the software request. Once the ADC read is completed, the system automatically switches back to synchronous mode.

In energy harvesting applications using sensors, data is typically gathered during long periods of low activity consuming relatively low power when compared with subsequent activities involving short bursts of computing-intense, high-power communication. The former period allows to harvest a sufficient amount of energy (from light, motion, etc.) to be able to provide power during the high-power communication phase.

In one embodiment, in order to enable energy harvesting in digital circuits, the dynamic mode switching system described in FIG. 4 is configured in a manner such that high-power communication events operate in clocked mode, while the data gathering phase operates in a lower power clock-less mode. This energy harvesting scheme may be particularly suited for applications that operate on low capacity batteries with uncertain lifetime, e.g., applications using water flow meters, but, of course, numerous other applications may benefit from a reduction in power consumption of the digital circuitry.

Figure 5:
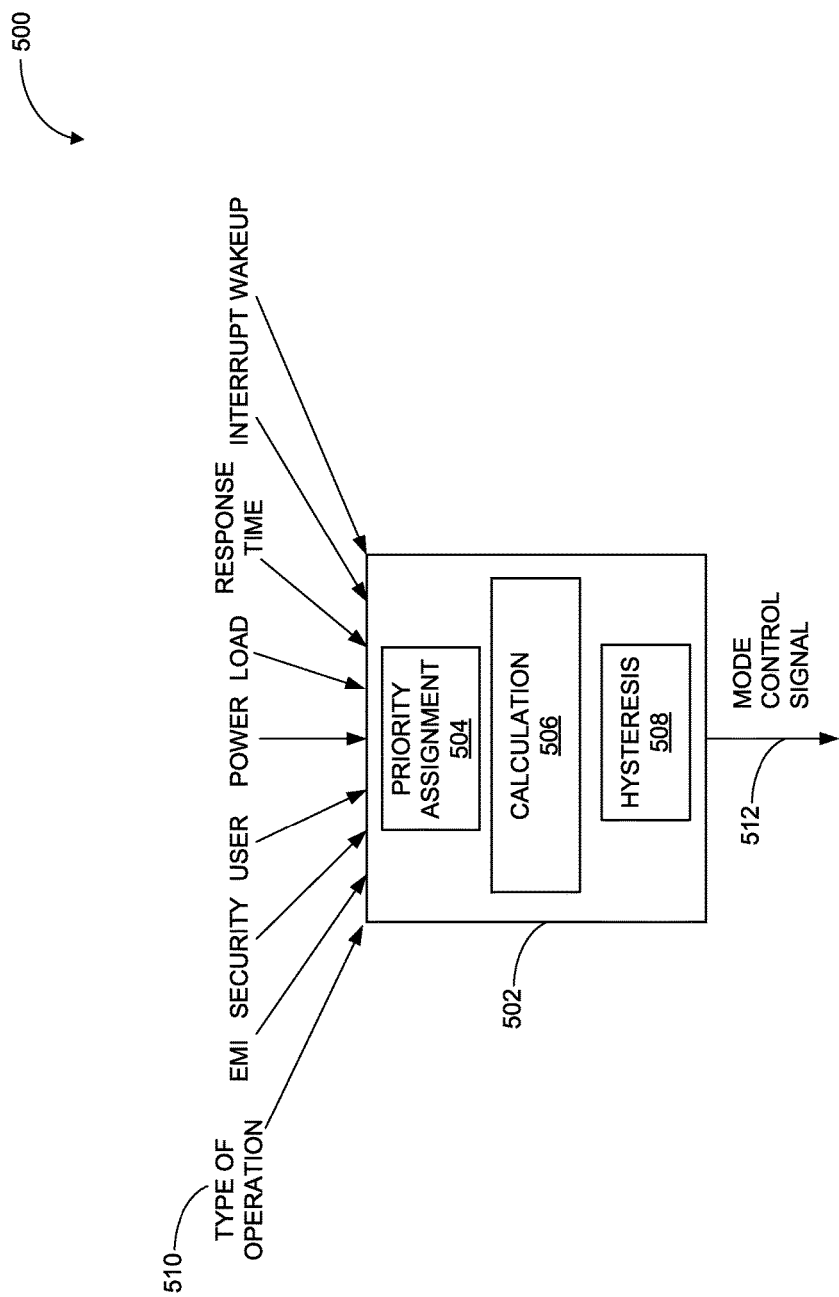
FIG. 5 illustrates an exemplary system to dynamically control modes according to various embodiments of the invention.

FIG. 5 illustrates an exemplary system to dynamically control modes according to various embodiments of the invention. Controller 502 comprises priority assignment module 504, calculation module 506, and hysteresis module 508, which may be used to prevent too rapid switching from one mode to another. Controller 502 is coupled to receive a plurality of input signals 510. The following is non-exclusive list of possible input signals 510: system load, power supply, user selection, security level, electromagnetic emission requirements, response time, interrupt requests, wakeup events, and type of operation. The type of operation may include temperature measurement, ADC operation, cryptographic operation, synchronous communication, etc. It is noted that other and additional inputs are possible, for example, input signals related to factory testing.

In operation, system 500 may combine energy, security, and system load control functions in order to dynamically generate mode control signal 512. Mode control signal 512 allows a digital circuit that is coupled to system 500 to switch between modes of operation in order to allow the circuit to selectively operate synchronously or asynchronously. Switching between modes may be controlled based on a variety of conditions that are internal and/or external to the circuit.

In one embodiment, controller 502 assigns a priority to one or more inputs 510 through priority assignment module 504. For example, security requirements may be categorized as having a higher priority than user preferences. Calculation module 506 is coupled to priority assignment module 504 and calculates an optimum operating mode based on the priorities that were assigned to one or more inputs 510. For example, an event-driven mode may be preferred when input 510 for "power supply" indicates that the system operates on batteries, or when input 510 for "response time" indicates that an event-driven mode would provide a shorter wakeup time. Other inputs 510 that tend to favor operation in an event-driven mode include "security level," as event-driven mode is generally more advantageous to achieve higher security, and "electromagnetic emission requirements," as event-driven mode is typically causes less emissions.

Hysteresis module 508 may apply a delay to the calculated optimum operating mode signal prior to outputting mode control signal 512 in order to suppress undesired rapid mode switching. In one embodiment, a set of priorities is pre-determined, such that all inputs 510 have different priorities from each other. This embodiment may be implemented, for example, with a simple digital circuit comprising a relatively small number of gates.

Overall, system 500 allows dynamic switching between a low power, asynchronous mode of operation to a higher power, synchronous mode of operation based on input 510, thereby, taking advantage of synchronous and asynchronous circuit elements to reduce power consumption.

Figure 6:
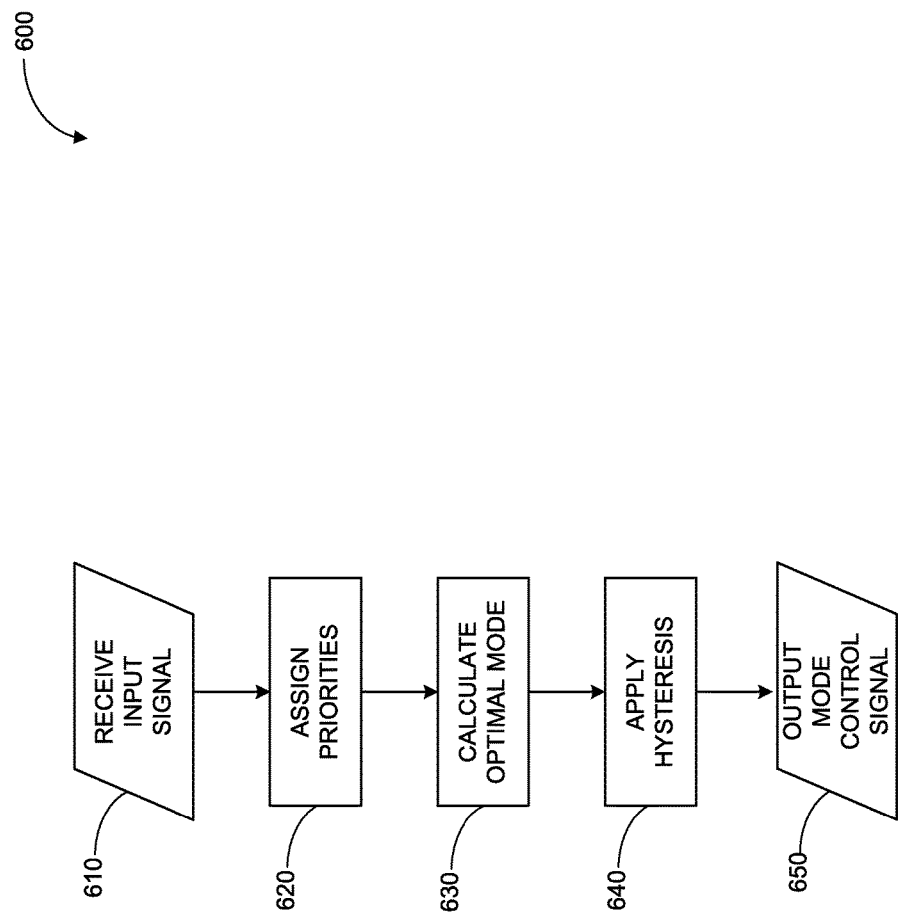
FIG. 6 is a flowchart illustrating an exemplary method to generate a mode control signal, according to various embodiments of the invention.

FIG. 6 is a flowchart illustrating an exemplary method to generate a mode control signal, according to various embodiments of the invention. In example in FIG. 6, the method to generate a mode control signal to dynamically switch between modes begins at step 610 when one or more input signals are received, for example, from the sampling of an input signal that consists of one or more bits (e.g., 32-bit) or from an interrupt request.

At step 620, priorities are assigned to the input signals, for example, a higher priority may be assigned to a security level signal than to a non-security related signal.

At step 630, an optimal mode is calculated, for example, based on one or more input signals and their assigned priorities. The optimal mode may be determined based on the priority of input signals.

At step 640, a hysteresis, for example in the form of a delay, is applied to an output mode control signal in order to prevent rapid mode switching.

At step 650, the mode control signal is output from the system.

It will be appreciated by those skilled in the art that fewer or additional steps may be incorporated with the steps illustrated herein without departing from the scope of the invention. No particular order is implied by the arrangement of blocks within the flowchart or the description herein.

Figure 7:
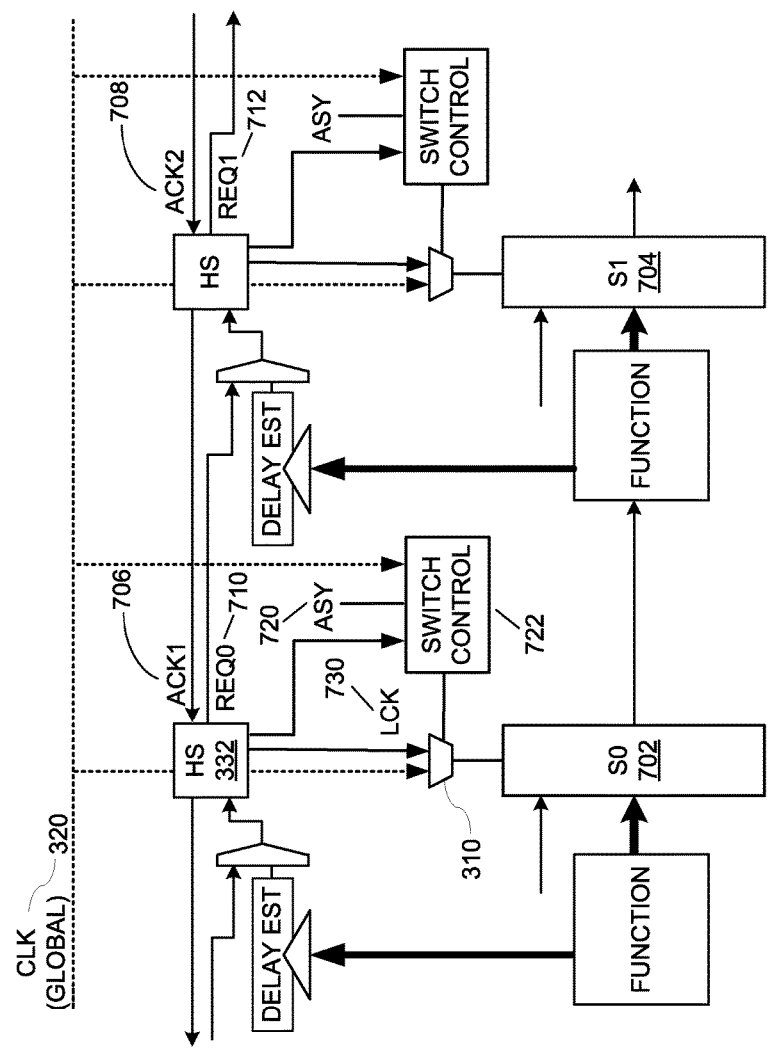
FIG. 7 illustrates an exemplary microcontroller pipeline system with localized mode switch control, according to various embodiments of the invention.

FIG. 7 illustrates an exemplary microcontroller pipeline system with localized mode switch control, according to various embodiments of the invention. The two stages S0 702 and S1 704 in FIG. 7 and their request and acknowledge signals REQ 710, 712 and ACK 706, 708 are similar to those shown in FIG. 3. Unlike the circuit in FIG. 3, control signal 720 is not directly causing mode control module 310 to perform mode switching. Instead, in one embodiment, system 700 comprises logic function 722 that is coupled to mode control module 310 for each pipeline stage 702, 704, and logic function 722 evaluates global clock signal 320, request signals 710, 712 and acknowledge signals 706, 780 from the handshaking network for pipeline stage 702 and 704, respectively.

In one embodiment, system 700 allows stage-by-stage adaptive switching by enabling local mode switching for each stage 702, 704. Switching is controlled by local handshaking signals and global clock 320. This embodiment avoids pipeline flush losses that may reduce performance by as much as 30% and unnecessarily increase energy consumption caused by stalling that occurs when several instructions that were previously fetched are discarded, and additional time and energy is spent to re-fill the pipeline in the new operating mode. Localized operating mode switching in system 700 allows instructions that were fetched from the memory (not shown) to complete without costly pipeline re-fills or stalls.

Figure 8:
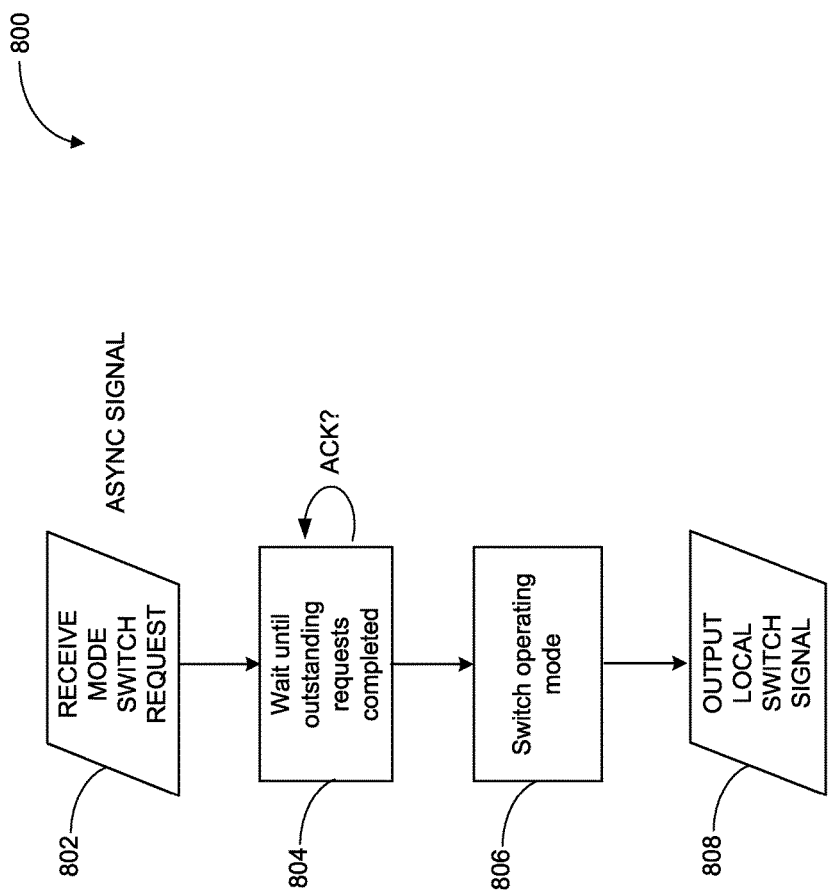
FIG. 8 is a flowchart illustrating an exemplary method to locally switch operating modes, according to various embodiments of the invention.

FIG. 8 is a flowchart illustrating an exemplary method to locally switch operating modes, according to various embodiments of the invention. FIG. 8 shows a flow chart for local operating mode switching to clock-driven operation. Switching to event-driven mode (not shown) is similar, except that the switch event is calculated based on the global clock instead of 'REQ' and 'ACK' signals.

It is noted that that the systems and methods to switch between operating modes herein are not limited to pipelined microcontroller systems, but equally apply to any blocks of circuitry that are coupled in a logic relationship of "preceding" and "succeeding" (these map to "previous stage" and "following stage" in the pipelined systems shown).

Figure 9:
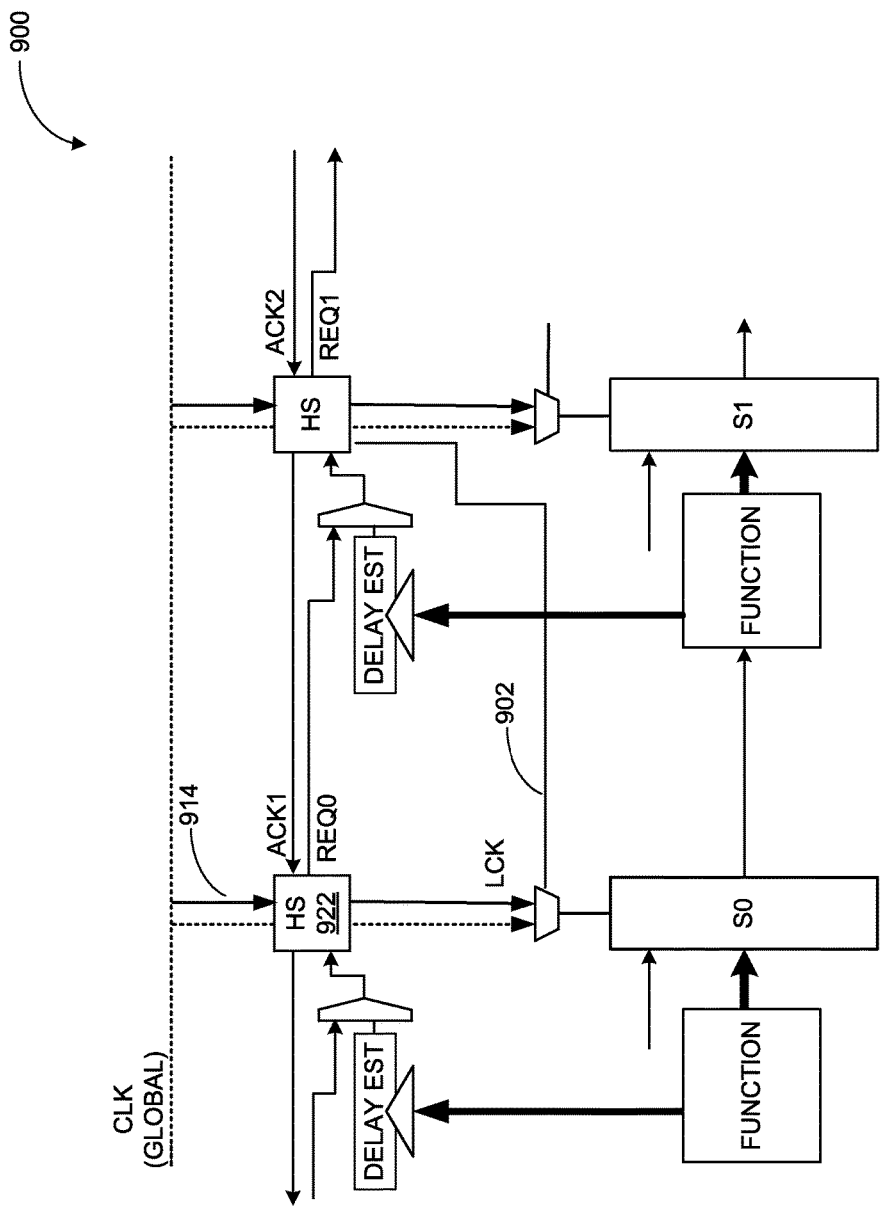
FIG. 9 illustrates an exemplary microcontroller pipeline system with localized, sequential mode switch control, according to various embodiments of the invention.

FIG. 9 illustrates an exemplary microcontroller pipeline system with localized, sequential mode switch control, according to various embodiments of the invention. In one embodiment, a localized mode switching system uses the handshaking control logic of the circuitry that logically follows to directly control the switching sequentially. This implementation simplifies the switching circuitry and reduces the number of required logic elements. In FIG. 9, handshake block 922 of the logically following circuitry assumes the operating mode control. To this end, control output signal 902, which is a local, sequential event-driven control signal, and global clock input signal 914 have been added to the handshaking control.

Figure 10:
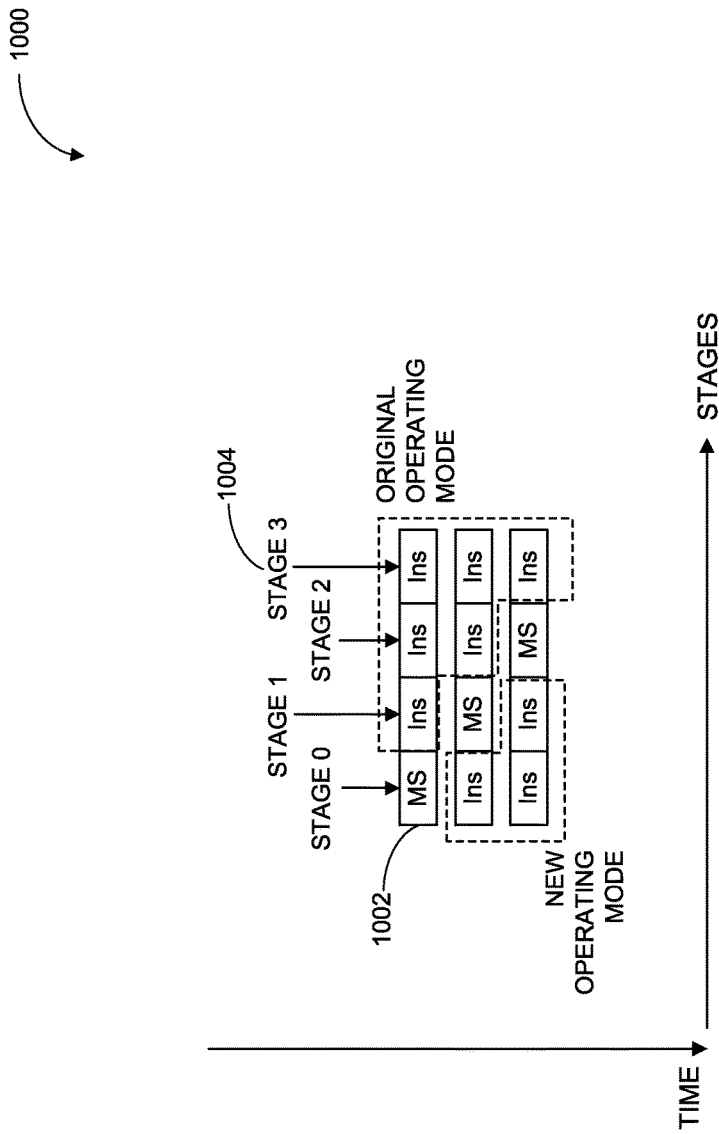
FIG. 10 is a diagram illustrating an exemplary progression of mode switching instructions through a pipeline, according to various embodiments of the invention.

FIG. 10 is a diagram illustrating an exemplary progression of mode switching instructions through a pipeline, according to various embodiments of the invention. In one embodiment, in a programmable system, such as a microcontroller, operating mode switch instructions 1002 are integrated into the instruction set so that each pipeline stage switches operating modes by decoding the mode switch instruction locally as the instruction progresses through the pipeline as illustrated in FIG. 10. Each pipeline stage 1004 can execute the mode switch based on the instruction, thereby, eliminating the need for a global control signal, such as the ASY signal previously shown in FIG. 7. As a result, area and connectivity requirements can be reduced providing additional benefits to localized mode switching. In one embodiment, mode switch instructions are inserted into the instruction stream by hardware, for example in response to an interrupt, or the mode switch instructions are generated as part of decomposing a macro-instruction, or as a micro-instruction.

Figure 11:
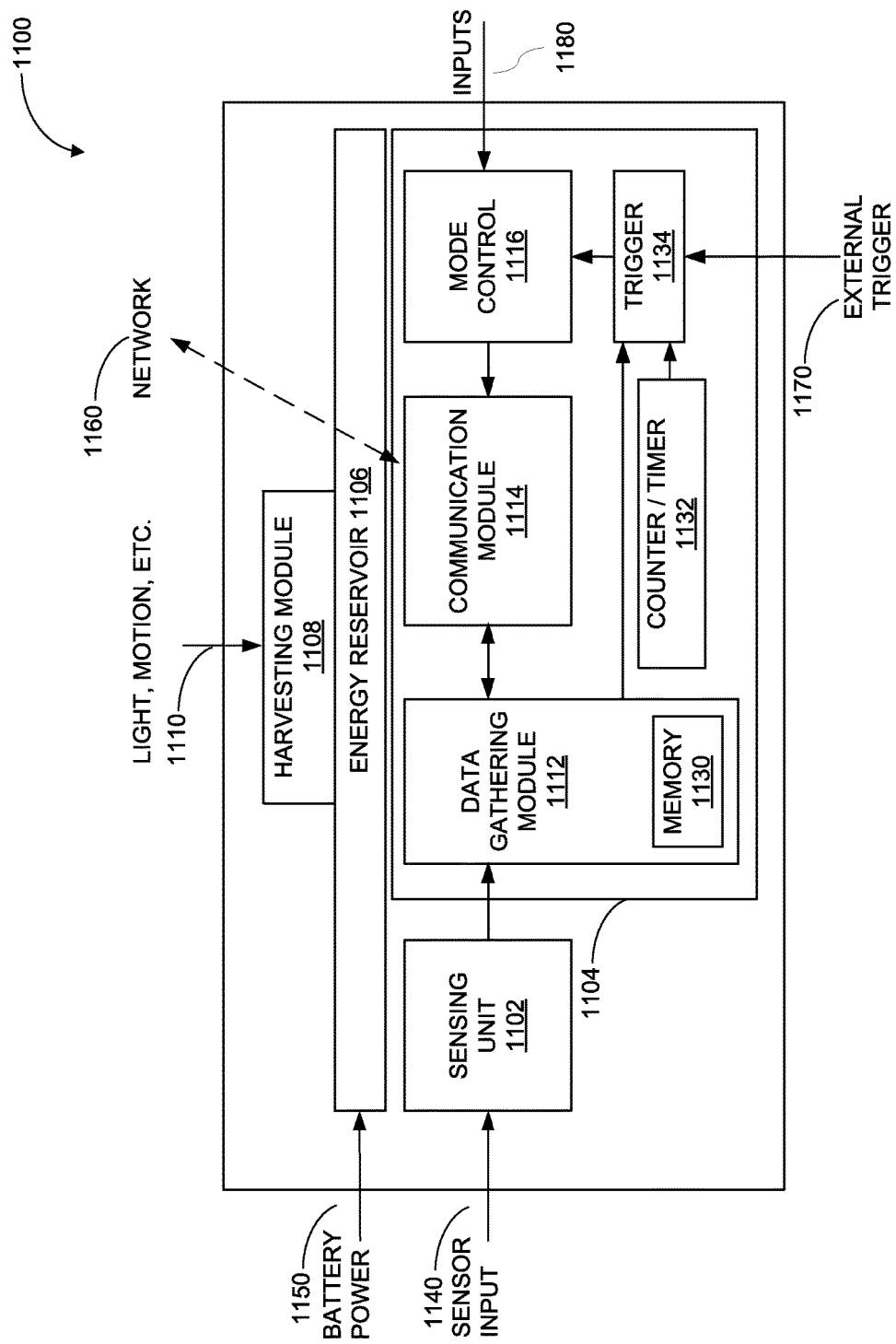
FIG. 11 is an exemplary block diagram illustrating an energy harvesting system utilizing mode switching, according to various embodiments of the invention.

FIG. 11 is an exemplary block diagram illustrating an energy harvesting system utilizing mode switching, according to various embodiments of the invention. Energy harvesting system 1100 comprises sensing unit 1102, processor 1104, energy reservoir 1106, and energy harvesting module 1108. Sensing unit 1102 receives one or more input signals 1140 from an external or internal sensor and delivers an output signal to processor 1104. Input signal 1140 is representative of a sampled physical quantity (e.g., voltage or temperature) or an environmental condition.

Processor 1104 comprises data gathering module 1112, communication module 1114, mode control module 1116, memory 1130, counter/timer 1132, and trigger element 1134. Trigger element 1134 is coupled to data gathering module 1112, counter/timer 1132 and/or external trigger 1170. Data gathering module 1112 is coupled to sensing unit 1102 and memory 1130, which may be internal or external to data gathering module 1112 and, in one embodiment, is shared with communication module 1114.

In example in FIG. 11, communications module 1114 interfaces with the outside world via external network 1160, for example through a wireless interface. Mode control module 1116 receives an input signal from trigger element 1134 and outputs a signal to communication module 1114. Energy reservoir 1106 provides energy to system 1100. In one embodiment energy reservoir 1106 is coupled to receive power from an outside energy source, such as battery 1150 and/or energy harvesting module 1108.

In operation, sensing unit 1102 receives input signal 1140 from an external or internal sensor and delivers a sensor signal to processor 1104. In one embodiment, input signal 1140 is monitored for a relatively long period of time as determined by counter/timer 1132 and at a relatively low power level. The sensor signal is then forwarded to data gathering module 1112 for further processing.

In one embodiment, communication module 1114 is configured to instruct data gathering module 1112 to collect data from sensing unit 1102. Communication module 1114 accesses the data through memory 1130 or through data gathering module 1112 directly. In one embodiment, communication module 1114 is configured to initiate a wakeup procedure to reverse an idle state of one or more components within processor 1104.

Mode control unit 1116 determines whether to transition from a low power mode to a high power mode based on a trigger signal by trigger element 1134 and generates a mode control signal to dynamically switch between modes. In one embodiment mode control unit 1116 is configured to detect whether system 1100 has entered a safe state in which certain components of processor 1104 are kept in an idle state. In response, mode control unit 1116 inverts its output in order to signal to communication module 1114 to operate system 1100 in a different mode, e.g., at a relatively higher power level in order to communicate or process the data collected by data gathering module 1112. In one embodiment mode control unit 1116 is configured to assign priorities to gathered data and calculate, based on priority, into which mode to transition, if any, and generate a transition signal that is input to communications module 1114. In one embodiment mode control unit 1116 is configured to delay the transition signal in order to avoid too frequent responses to the trigger signal by trigger element 1134, which otherwise could cause system 1100 to undergo unnecessarily rapid switching events.

In one embodiment, while data gathering module 1112 collects data, energy reservoir 1106 receives power from energy harvesting module 1108, which harvests energy from an external source 1110, such as light or motion, by any means known in the art. In the energy harvesting phase, system 1100 operates in a low power, clock-less mode. This energy is used during the high-power phase in which system 1100 is switched into a clocked mode in order to ensure a sufficient supply of energy is delivered to power system 1100 and communication module 1114.

Figure 12:
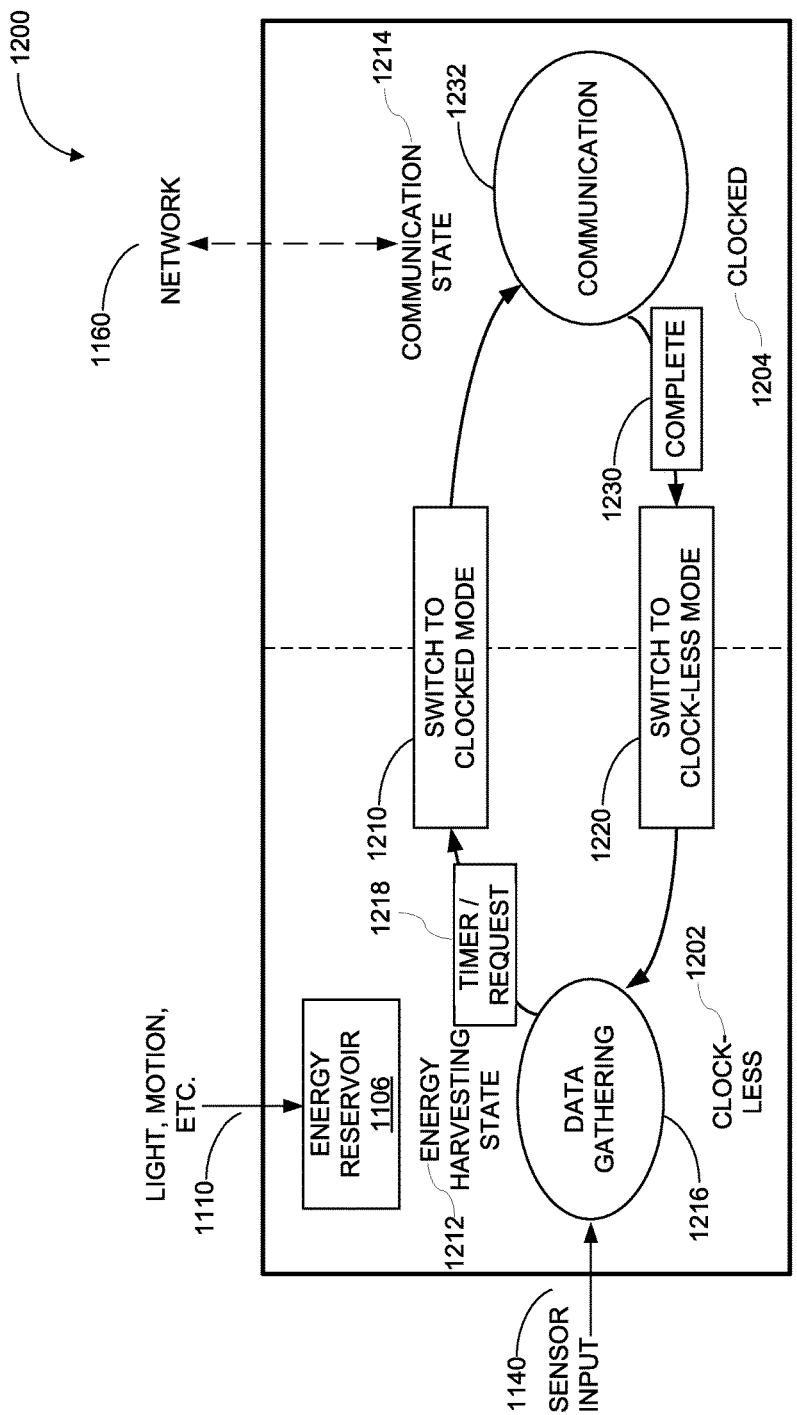
FIG. 12 is an operational flow diagram illustrating an energy harvesting system utilizing mode switching, according to various embodiments of the invention.

FIG. 12 is an operational flow diagram illustrating an energy harvesting system utilizing mode switching, according to various embodiments of the invention. Same numerals as in FIG. 11 denote similar elements. As shown in FIG. 12, energy harvesting system 1200 operates and transitions mainly between two main modes, clock-less mode 1202 and clocked mode 1204. In one embodiment, each mode has one or more states. In clock-less 1202 mode, system 1200 enters data gathering state 1216 in which system 1200 gathers data from sensors 1140, for example, temperature or humidity sensors. In one embodiment, the gathered data is temporarily stored in a memory device (not shown). In data gathering state 1216, system 1200 also charges energy reservoir 1106 by harvesting energy from various sources of energy 1110, such as light, motion, etc.

In clocked mode 1204, system 1200 enters the communication state 1214. In one embodiment, switching from one state to another state is initiated in response to determining that system 1200 has gathered a predetermined amount of data. In one embodiment, switching from one state to another state is initiated periodically. In one embodiment, switching is initiated in response to a user request.

In one embodiment, in communication state 1214, system 1200 first processes the collected data, for example by using a filtering algorithm; system 1200 activates one or more communication interfaces, such as a wireless link; and transmits the collected data to an external network. In one embodiment, system 1200 receives instructions or configuration information, or other data from network 1160. In one embodiment, system 1200 is equipped with a user interface that is updated in communication state 1214.

In example in FIG. 12, once processing in the communication state 1214 is complete, system 1200 switches back from clocked mode 1204 to energy-efficient clock-less mode 1202 in order to resume gathering data in energy harvesting state 1212.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A multi-mode system that supports dynamic mode control of clock-driven and event-driven circuit operation, the system comprising: a plurality of data processing circuits coupled in a series configuration; an asynchronous circuit that generates a local control signal; and a mode control circuit coupled to the asynchronous circuit and at least one of the plurality of data processing circuits, the mode control circuit receives the local control signal and a global clock signal to generate a mode switch signal that enables transitions between a clock-driven mode of operation and an event-driven mode of operation for the at least one of the plurality of data processing circuits to reduce power consumption, the mode control circuit is controlled by a mode control signal for the generation of the mode switch signal, the mode control signal is generated based on priorities assigned to a plurality of input signals, upon a transition from an existing operation mode to a different operation mode is determined, the multi-mode system enters into a safe state in which one or more predetermined components are kept in an idle state before the multi-mode system operates in the different operation mode, the existing operation mode is the clock-driven mode or the event-driven mode.

2. The system according to claim 1, wherein at least one of the clock-driven mode of operation and the event-driven mode comprises one or more states.

3. The system according to claim 2, wherein in the event-driven mode a delay estimator circuit that is coupled to the asynchronous circuit causes the asynchronous circuit to generate the local control signal.

4. The system according to claim 3, further comprising a switch controller coupled to the mode control circuit, the switch controller evaluates the global clock signal and the local control signal.

5. The system according to claim 4, wherein the switch controller uses a stage-by-stage adaptive switching that allows instructions to complete to reduce pipeline flush losses.

6. The system according to claim 1, further comprising a hysteresis circuit that causes a delay in the mode switch signal to reduce a frequency of transitions between the plurality of modes of operation.

7. The system according to claim 1, wherein the mode control circuit generates the mode switch signal based on an analysis of one or more input signals.

8. The system according to claim 1, wherein generating the mode switch signal comprises decoding a mode switch instruction within the at least one of plurality of data processing circuits.

9. A method to dynamically control transitions between clock-driven and event-driven circuit operation, the method comprising: generating a local control signal via using an asynchronous circuit that is coupled within a multi-mode system; receiving the local control signal and a global clock signal by a mode control circuit; based on the local control signal and the global clock signal generating a mode switch signal, the mode control circuit is controlled by a mode control signal for the generation of the mode switch signal, the mode control signal is generated based on priorities assigned to a plurality of input signals; forwarding the mode switch signal to a data processing circuit; and based on the mode switch signal, transitioning between a clock-driven mode of operation and an event-driven mode of operation for the data processing circuit to reduce power consumption in the multi-mode system, upon a transition from an existing operation mode to a different operation mode is determined, the multi-mode system enters into a safe state in which one or more predetermined components are kept in an idle state before the multi-mode system operates in the different operation mode, the existing operation mode is the clock-driven mode or the event-driven mode.

10. The method according to claim 9, further comprising evaluating the global clock signal and the local control signal to determine whether to initiate a transition.

11. The method according to claim 9, further comprising applying stage-by-stage adaptive switching to allow instructions to complete, thereby, reducing pipeline flush losses.

12. The method according to claim 9, wherein the mode switch signal is generated based on an analysis of one or more input signals each having a priority.

13. The method according to claim 9, further comprising applying a hysteresis to the mode switch signal to cause a delay in the mode switch signal to reduce a frequency of transitions between the plurality of modes of operation.

14. The method according to claim 9, further comprising a pipeline flush before the multi-mode system operates in the different operation mode.

15. The method according to claim 9, further comprising gathering sensor data and harvesting energy in the event-driven mode.

16. The method according to claim 15, further comprising:
activating a communication interface;
transmitting the sensor data to an external network; and
receiving data from the external network.

17. A mode controller that supports dynamic mode control of clock-driven and event-driven sequences, the mode controller comprising:
a priority assignment module receiving a plurality of input signals, the priority assignment module assigns priorities to at least some of the plurality of input signals;
a calculation module coupled to the priority assignment module, the calculation module generates a mode control signal based on the priorities of the plurality of input signals to enable transitions between a clock-driven mode and an event-driven mode of operation for at least one data processing circuit coupled to the mode controller; and
a hysteresis module that causes a delay in the mode control signal to reduce a frequency of transitions between the clock-driven mode and the event-driven mode of operation;
wherein the delayed mode control signal is forwarded to a communication module, the communication module is configured to instruct a data gathering module to gather one or more input signals from a sensing unit, upon a transition from an existing operation mode to a different operation mode is determined, the mode controller enters a safe state in which a pipeline flush is implemented before the at least one data processing circuit operates in the different operation mode, the existing operation mode is the clock-driven mode or the event-driven mode.

* * * * *